Aug. 9, 1960     T. J. C. JEPSEN     2,948,532
TETHERED BALL
Filed Nov. 1, 1957
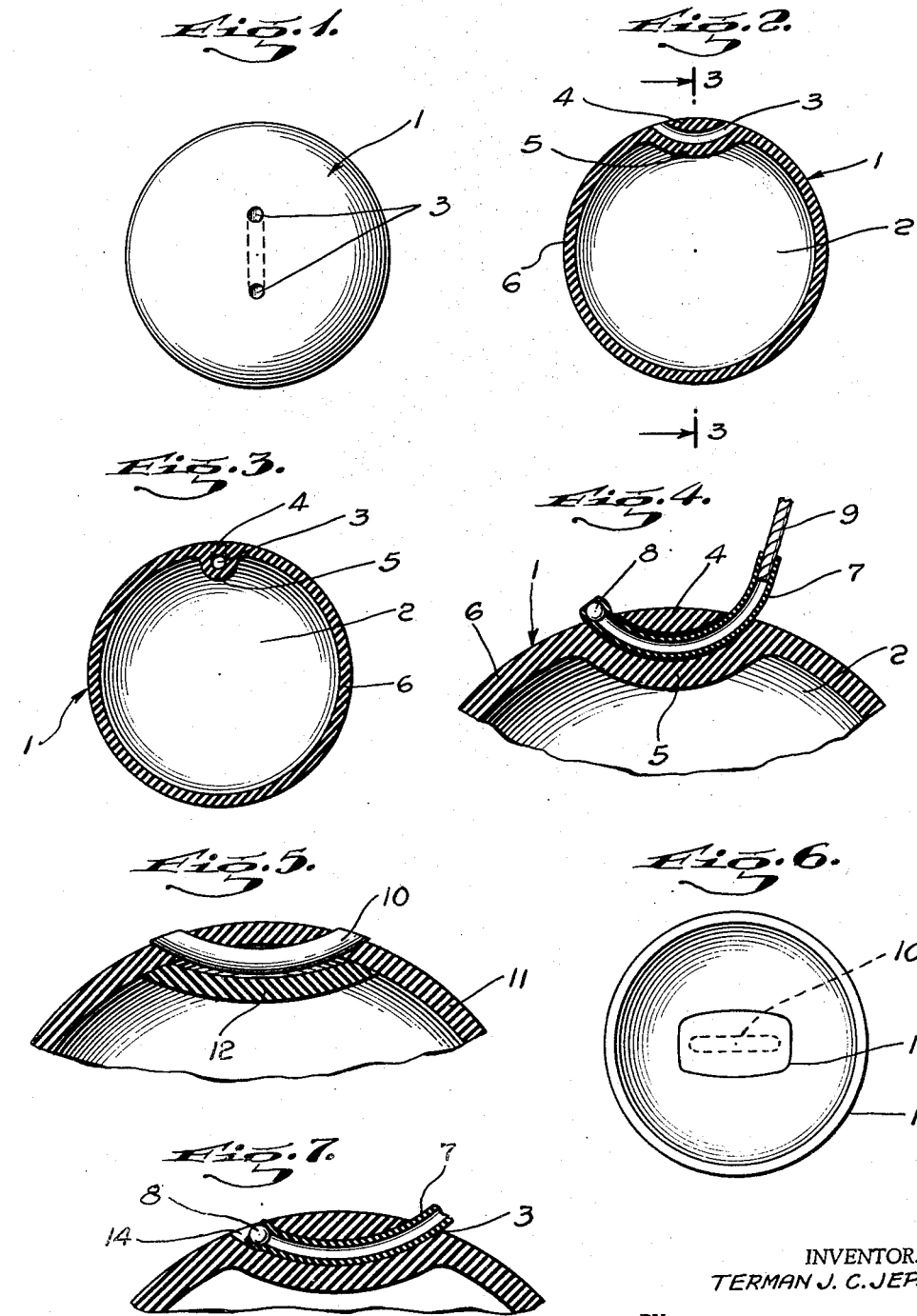
INVENTOR.
TERMAN J. C. JEPSEN
BY
AGENT United States Patent Office 2,948,532
Patented Aug. 9, 1960

2,948,532
TETHERED BALL

Terman J. C. Jepsen, Los Angeles, Calif.
(5624 Fair Ave., North Hollywood, Calif.)

Filed Nov. 1, 1957, Ser. No. 693,991

Claims priority, application Denmark Jan. 28, 1957

4 Claims. (Cl. 273—58)

This invention relates to a novel ball and to means for fastening a cord to a gas-filled, resilient ball.

It is known to fasten a cord to a ball by pulling the cord through a diametrical channel through the ball. This is inconvenient as the ball must be made of solid sponge rubber, which is not very resilient. Alternatively, the channel must be made of a gastight rubber tube with the effect that the springiness of the ball will be inferior in the direction of the channel as compared with that of other directions.

It is also known to form a ball with projections for fastening the cord, but these projections interfere with the use of the ball for games and sport, for which purposes the ball must be a smooth, round body, preferably spherical.

Furthermore, it is known to fasten the cord to heterogeneous parts cast or vulcanized in the ball, or to parts that are fitted in a peripheric cavity in the ball after the latter has been manufactured. However, these heterogeneous parts are harder or much bulkier than the walls of the ball, for which reason the ball will no longer be perfectly resilient. Further, the heterogeneous parts are more often than not so heavy that the good properties of the ball are lost in consequence of the greater weight and the more difficult balancing.

The known means for fastening are also inconvenient because it takes too long to fasten the ball to or remove it from the cord.

It is an object of the present invention to produce a ball with a channel for fastening a cord so that when the cord is removed the ball has the same good properties as an ordinary gas-filled, resilient rubber ball of good make.

The means in accordance with the invention for fastening a cord in a ball consists in a ball having a channel in the side thereof with walls integral with and of practically the same thickness as the wall of the ball, said channel being open at both ends exterior of the ball proper, and a cord which has an expansion at its one extreme end which may be and is pulled through the channel. By this construction it becomes possible easily to fasten a cord to a spherical ball of a uniform or at least nearly uniform springiness in all directions and for all parts of the ball.

The means for fastening comprises in part a cord at least one end of which is tubular and elastic. In addition, the extreme end of the tubular part is enlarged by means of a plug therein, preferably a spherical ball whose diameter is somewhat larger than the internal diameter of the channel when added to the wall thickness of the expanded tube. Thus, the cord may be easily introduced into the channel and pulled through, the expanded part of the tubular cord preventing it from being unintentionally loosened from the ball. The plug is so small that it does not affect the properties of the ball at all, and furthermore it is fitted to and may be removed together with the cord.

A suitable method of manufacturing a ball in accordance with the invention consists in the pressing in of a not undercut core, preferably of metal, such as a steel rod, in one of the sides of a rubber ball produced in the traditional way, but only partially vulcanized and not yet formed into ball shape, following which—in a ball mould —a cut rubber sheet, preferably with bevelled edges, is vulcanized thereon at the final vulcanization and inflation of the ball, or prior thereto, so that in general the sheet covers the part of the core that comes inside the original outer surface of the rubber ball and makes it airtight.

It thus becomes possible in a simple way to produce a gas-filled, resilient ball with a channel having everywhere approximately the same wall thickness as the ball, and being absolutely airtight as far as the hollow interior of the ball is concerned.

Figure 1 shows a ball with a channel in accordance with the invention, viewed towards the channel.

Figure 2 is a sectional view of the ball shown in Figure 1.

Figure 3 is a sectional view of the ball shown in Figure 2, but taken along a plane at right angles to the section shown in Figure 2.

Figure 4 is a portion of Figure 2 on an enlarged scale showing a cord fastened in the channel.

Figure 5 is the same section as shown in Figure 4, but immediately before the channel is vulcanized into the ball.

Figure 6 is the same detail as shown in Figure 5, viewed from what will be the inside of the ball.

Figure 7 shows a variation in detail of the channel shown in Figure 4.

Returning now to Figures 1, 2, and 3, 1 is a rubber ball whose hollow space 2 is filled with atmospheric air or some other suitable gas such as nitrogen. At one side the ball has a channel 3 whose walls 4 and 5 are of the same material and preferably the same thickness as the rest of the wall 6 of the ball. Through the channel is pulled a rubber or polyvinylchloride tube 7 whose extreme end is expanded by a small steel ball 8, which is just large enough to prevent the tube from slipping out of the channel. If the ball is to be fastened to a non-elastic cord, a short piece of rubber tube is nevertheless used which is vulcanized or glued on to the rest of the cord 9. If it is desired that the end of the tube 7 be flush with the surface of the ball, one end of the channel 3 is provided with an enlargement 14 to receive the part of the rubber tube that is expanded by the steel ball, as indicated in Figure 7.

As is clearly illustrated in Figs. 4 and 7, the ball 8 is located in the end of the tube 7 so that it is more than half enclosed in or encircled by the tube. Accordingly when the end of the tube in which the ball is located is drawn toward the channel as in Fig. 4 or into the enlarged portion 14 of the channel as illustrated in Fig. 7, the ball will be prevented from being forced out or escaping from the end of the tube.

The inside diameter of the channel is preferably a trifle larger than the outside diameter of the rubber tube, and to facilitate the fastening and removal of the cord some talc powder may be applied to the channel.

In manufacturing a ball in accordance with my invention, a curved piece of metal rod 10, as seen in Figure 5, is pressed into the side of the unfinished ball 11 so that its two ends project therethrough, and a cut rubber patch 12 with bevelled edges is placed on the inner surface of the ball so that it covers the piece of rod 10 which will act as a core for moulding the shape of the channel 3 at the subsequent finishing of the vulcanization in a mould not shown on the drawing. This core is preferably no longer than the channel will be, and should have its ends finished at an angle to conform with the spherical ball mold against which it will fit, as shown in the drawings.

The next step in the manufacture is to form the sheet containing the rod and patch into a gas-filled ball in the conventional manner, which is by enveloping the unvulcanized sheet around a small amount of suitable material which generates gas under the heat of the subsequent vulcanization, and placing this assembly in the usual spherical ball mold, followed by vulcanization in the conventional manner. When the vulcanization is finished, the rod is removed, which is easily accomplished because of the resiliency of the rubber and the arcuate shape of the rod. The rubber attaching tube 7 is then pushed through the channel, so that one end protrudes enough for the plug or ball 8 to be inserted, so as to prevent withdrawal of the tube. The assembly is then ready for use.

It will be understood that whereas particular embodiments have been described and exemplified, the invention is a broad one, and the claims which follow are to be given a similarly broad construction. Where "rubber" has been used in the specification and claims, it will be understood that this refers not only to natural rubber but to other springy, resilient elastomers having substantially the same properties as natural rubber, such as the various synthetic rubbers. I have found that the best material for use, not only for the ball itself but for the attaching tube 7, is natural rubber, because of its great extensibility, resiliency, and quick rebound.

Having described the invention, what I claim is:

1. In combination, a hollow resilent ball formed throughout solely of an elastometer, the ball having a portion of the wall provided with a channel having both of its ends open exteriorly of the ball, the channel from one open end to the other defining an unbroken arc walled solely by the elastomer material, an elongate elastic member of a length greater than that of the channel and extending through the channel, and of tubular form at least at one end, said one end of said elastic member being approximately co-terminus with the corresponding end of the channel, and a plug body in the said tubular end of said elastic member and maintaining said tubular end expanded to an outside diameter greater than the diameter of the channel whereby the elastic member is secured from being pulled from the other end thereof through the channel.

2. The invention according to claim 1, wherein the said channel at said corresponding end is of slightly enlarged diameter for a short distance and receives the plug expanded end of the elastic member.

3. The invention according to claim 1, wherein the plug is spherical and is encased around more than half of its surface by the tubular end of the elastic member and thereby held against escape when said expanded end is pulled against the said corresponding end of the channel.

4. The invention according to claim 1, wherein the ball wall thickness is increased on the inner side through an extent approximately equal to the length of the channel and the elastomer walls of the channel are of a thickness approximately equal to that of the surrounding wall of the ball proper.

References Cited in the file of this patent

UNITED STATES PATENTS

| | | |
|---|---|---|
| 830,581 | Fleischman | Sept. 11, 1906 |
| 830,582 | Fleischman | Sept. 11, 1906 |
| 2,025,918 | Van Cleef | Dec. 31, 1935 |
| 2,081,059 | Mitchell | May 18, 1937 |
| 2,243,620 | Fernandez | May 27, 1941 |
| 2,309,865 | Reach | Feb. 2, 1943 |
| 2,730,765 | Crafton et al. | Jan. 17, 1956 |

FOREIGN PATENTS

| | | |
|---|---|---|
| 84,015 | Sweden | July 30, 1935 |